(12) United States Patent
Kimura

(10) Patent No.: US 7,618,084 B2
(45) Date of Patent: Nov. 17, 2009

(54) REAR STRUCTURE OF VEHICLE BODY

(75) Inventor: Yosuke Kimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/895,967

(22) Filed: Aug. 28, 2007

(65) Prior Publication Data

US 2008/0073929 A1 Mar. 27, 2008

(30) Foreign Application Priority Data

Sep. 27, 2006 (JP) ............................. 2006-262260

(51) Int. Cl.
*B60J 5/10* (2006.01)

(52) U.S. Cl. .................. 296/146.8; 296/56; 296/146.11; 49/398

(58) Field of Classification Search .............. 296/180.1, 296/180.5, 56, 146.8, 146.9, 146.11, 152; 49/383, 398

See application file for complete search history.

(56) References Cited

U.S. PATENT DOCUMENTS

| | | | | |
|---|---|---|---|---|
| 4,908,908 A | * | 3/1990 | Mitsuoka et al. ............... | 16/251 |
| 6,234,564 B1 | * | 5/2001 | Kim ........................ | 296/146.8 |
| 6,405,486 B1 | * | 6/2002 | Rogers et al. .................. | 49/339 |
| 6,659,538 B2 | * | 12/2003 | Scheid .................... | 296/146.8 |
| 6,789,837 B2 | * | 9/2004 | Mitsui et al. .............. | 296/146.8 |
| 6,814,392 B1 | * | 11/2004 | Tomaszewski ........... | 296/146.4 |
| 7,021,698 B2 | * | 4/2006 | Yamada et al. ........... | 296/146.8 |
| 7,144,066 B2 | * | 12/2006 | Omori et al. ............. | 296/146.8 |
| 7,159,927 B2 | * | 1/2007 | Ihashi et al. ............. | 296/146.8 |
| 7,401,841 B2 | * | 7/2008 | Asendorf ............... | 296/146.11 |
| 2008/0148518 A1 | * | 6/2008 | Munenaga et al. ............ | 16/334 |

FOREIGN PATENT DOCUMENTS

| | | |
|---|---|---|
| EP | 1 369 273 A1 | 12/2003 |
| FR | 2 815 992 A1 | 5/2002 |
| JP | 2000-071776 | 3/2000 |
| JP | 2005-075195 | 3/2005 |

* cited by examiner

*Primary Examiner*—Glenn Dayoan
*Assistant Examiner*—Gregory Blankenship
(74) *Attorney, Agent, or Firm*—Carrier, Blackman & Associates, P.C.; William D. Blackman; Joseph P. Carrier

(57) ABSTRACT

A rear structure of a vehicle body in which a tailgate is mounted on a rear part of the vehicle body so as to be openable and closable includes a hinge member having a hinge base fixed into a groove extending in the length of the vehicle body and a gate hinge rotatably connected to the hinge base and fixed to the tailgate; a hinge cover having a rear wall to cover an upper portion and a rear portion of the hinge base by closing a rear end of the groove, the rear wall covering the rear portion of the hinge base and having: a notch allowing the gate hinge to pass therethrough, and a rear shielding member fixed to the tailgate to cover an upper portion of the gate hinge, wherein the notch is covered with the rear shielding member in a state where the tailgate is closed.

4 Claims, 4 Drawing Sheets

025
REAR STRUCTURE OF VEHICLE BODY

BACKGROUND OF THE INVENTION

1. Field of the Invention

The present invention relates to a rear structure of a vehicle body having a tailgate, and more particularly, to a peripheral structure of a hinge for rotatably mounting a tailgate on the vehicle body.

Priority is claimed on Japanese Patent Application No. 2006-262260, filed on Sep. 27, 2006, the content of which is incorporated herein by reference.

2. Description of the Related Art

Minivans or station wagons have an opening formed in a rear part of the vehicle body and the opening is provided with a pop-up tailgate. In these kinds of vehicles, the tailgate is mounted to be vertically rotatable about a hinge disposed at the rear end of the roof. The hinge needs to have a large and strong structure so as to firmly mount the tailgate on the vehicle body, but the large hinge may cause a deterioration in design of the vehicle body.

As a result, a vehicle body has been developed in which a hinge for mounting the tailgate is disposed in a groove having a U-shaped section formed in the roof of the vehicle body (for example, see Japanese Unexamined Patent Application, First Publication No. 2005-75195).

In the vehicle body, a hinge base is fixed to ends of U-shaped junction grooves which are formed in the junctions between both sides of a roof panel and roof side panels, extending in an anteroposterior direction of the vehicle body. Extension ends of gate hinges fixed to the upper end of the tailgate are rotatably connected to the hinge base. A resin hinge cover covering the hinge base is mounted on the junction groove of the vehicle body to which the hinge base is fixed. A notched groove for allowing a rotational displacement of the gate hinge accompanied with opening and closing operations of the tailgate is formed in a rear wall of the hinge cover.

However, in the conventional rear structure of the vehicle body, since the notched groove for allowing the displacement of the gate hinge is formed in the rear wall of the hinge cover, the notched groove is exposed from the rear of the vehicle body when the tailgate is closed, thereby deteriorating its appearance.

SUMMARY OF THE INVENTION

The present invention provides a rear structure of a vehicle body capable of improving the appearance of a tailgate mounting portion.

According to an aspect of the present invention, a rear structure of a vehicle body in which a tailgate is mounted on a rear part of the vehicle body so as to be openable and closable includes: a hinge member having a hinge base fixed into a groove extending in the length of the vehicle body, and a gate hinge rotatably connected to the hinge base and fixed to the tailgate; a hinge cover having a rear wall covering the rear portion of the hinge base and having a notch allowing the gate hinge to pass therethrough the hinge cover closing a rear end of the groove covering an upper portion and a rear portion of the hinge base; and a rear shielding member fixed to the tailgate so as to cover an upper portion of the gate hinge, wherein the notch is covered with the rear shielding member in a state where the tailgate is closed.

According to this configuration, an extension end of the gate hinge can move within the notch of the rear wall of the hinge cover with the opening and closing operations of the tailgate. In a state where the tailgate is closed, the rear shielding member disposed at the upper end of the tailgate covers up the notch of the hinge cover.

Accordingly, it is possible to satisfactorily improve the appearance of the tailgate mounting portion.

In the rear structure of the vehicle body, the rear shielding member may be formed to be continuously flush with an outer surface of the hinge cover with the tailgate closed.

According to this configuration, the hinge cover at the roof of the vehicle body and the rear shielding member at the tailgate are formed to be flush with each other.

Accordingly, it is possible to further improve the appearance of the tailgate mounting portion.

In the rear structure of the vehicle body, an attitude holding member holding a mounting attitude of the rear shielding member may be disposed at a position of the rear shielding member opposed to an outer surface of a frame panel.

According to this configuration, the attitude of the rear shielding member is stably held by means of the attitude holding member at all times.

Accordingly, it is possible to maintain an appearance quality of the vehicle body even in a state where an impact accompanied with the opening and closing operations of the tailgate is frequently applied to the vehicle body.

In the rear structure of the vehicle body, the groove may be formed to have a U-shaped section out of lateral ends of a roof panel of the vehicle body and roof side panels of the vehicle body.

In the rear structure of the vehicle body, a locking piece locked to an upper front corner of a frame panel of the tailgate may be disposed in the rear shielding member.

According to this configuration, the rear shielding member is stably supported in the corner of the frame panel in a positioned state.

Accordingly, it is possible to mount the rear shielding member on the frame panel of the tailgate with ease and precision.

In the rear structure of the vehicle body, a hem abutting portion abutting a hem processing portion disposed in the corner of the frame panel may be disposed in the locking piece.

Accordingly, it is possible to more tightly mount the rear shielding member on the frame panel by abutting the hem abutting portion disposed in the locking piece on the strong hem processing portion at the frame panel side.

By this configuration, the rear shielding member is more stably supported in the strong hem processing portion of the frame panel.

In the rear structure of the vehicle body, a portion of the rear shielding member, which is spaced from the locking piece, may be fixed to the frame panel by means of a clip.

According to this configuration, the rear shielding member is stably mounted by means of the clip with the locking piece locked to the corner of the frame panel.

Accordingly, since it is possible to fix the shielding member to a frame member by locking the locking piece to the corner of the frame panel and the clip fixation, it is possible to mount the rear shielding member on the tailgate easily and stably.

DESCRIPTION OF THE PREFERRED EMBODIMENTS

Hereinafter, an embodiment of the present invention is described with reference to the accompanying drawings. In the following description, "upper" and "lower" of a tailgate 2 denote the upper side and the lower side of the tailgate 2, respectively, in a state where the tailgate 2 is closed.

Figure 1:
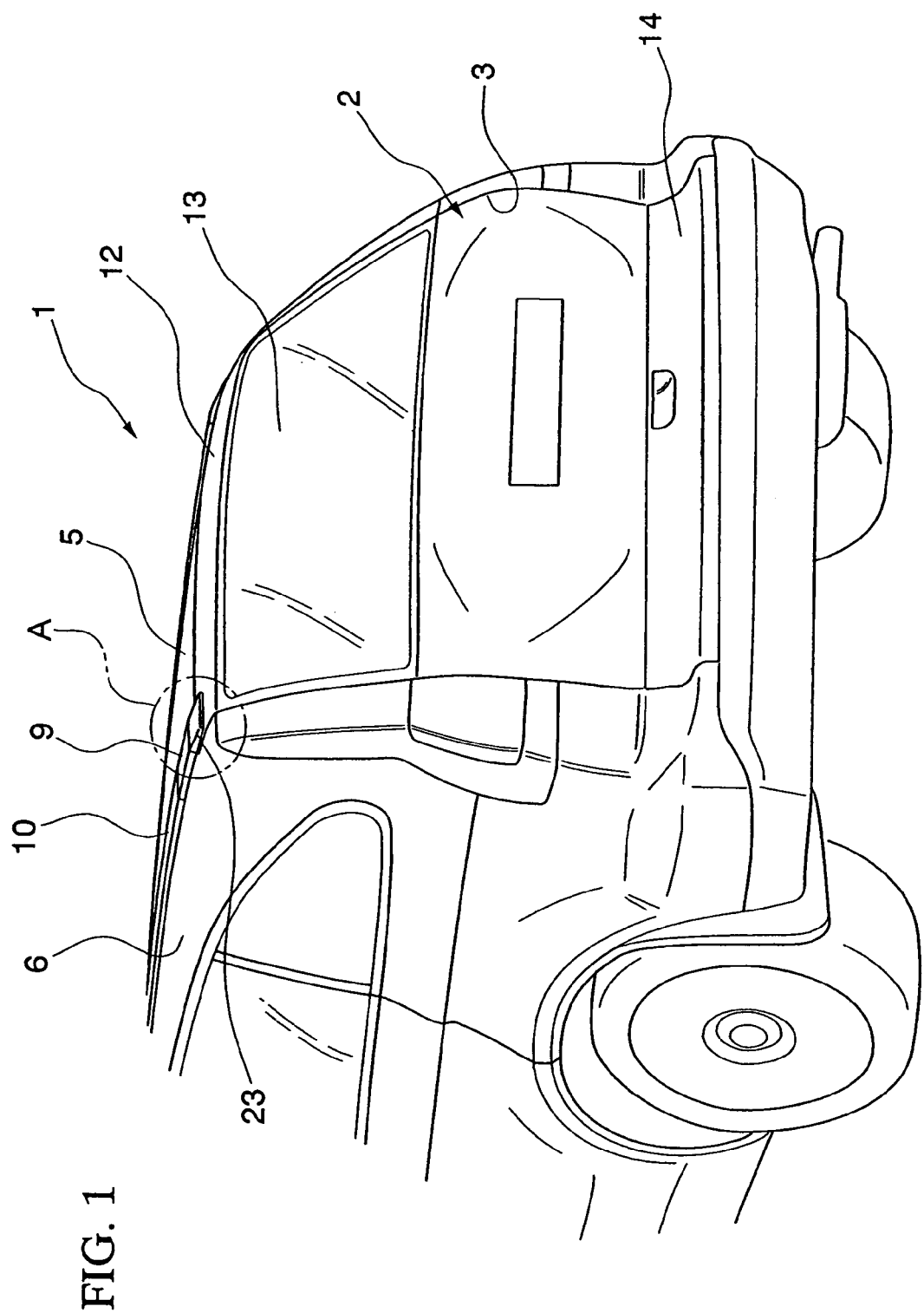
FIG. 1 is a perspective view showing a rear part of a vehicle body according to an embodiment of the present invention.

FIG. 1 is a drawing showing a vehicle body 1 employing a rear structure according to the present invention, as obliquely viewed from the rear side. A door opening 3 is disposed in the rear part of the vehicle body 1. The tailgate 2 is mounted at an upper portion of the door opening 3 so as to be openable and closable in the vertical direction about a hinge 4 (hinge member) shown in FIGS. 4 and 5.

Figure 2:
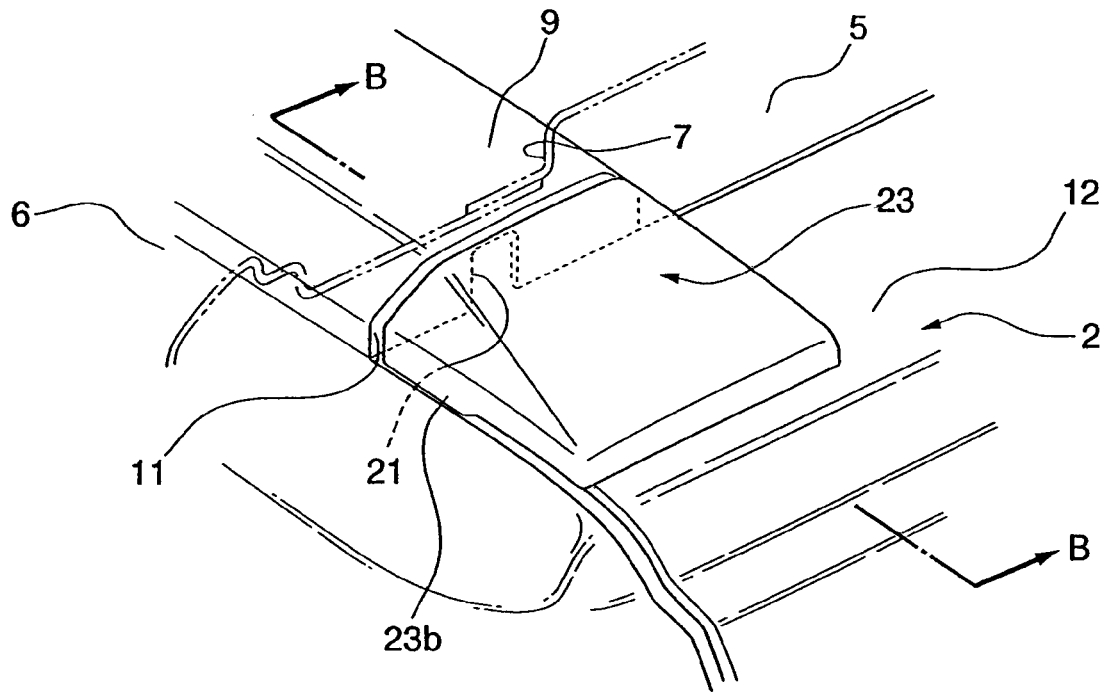
FIG. 2 is an enlarged perspective view showing part A of FIG. 1.

FIG. 2 is an enlarged perspective view of part A of FIG. 1. Referring to FIG. 1, roof side panels 6 are connected to a roof panel 5 serving as a roof of the vehicle body at both sides in the vehicle width direction. Lateral ends of the roof panel 5 and lateral ends of the roof side panels 6 are each curved in a step shape and are jointed to each other, thereby forming a junction groove (groove) 7 having a substantially U-shaped section, which extends in the length of the vehicle body.

Figure 4:
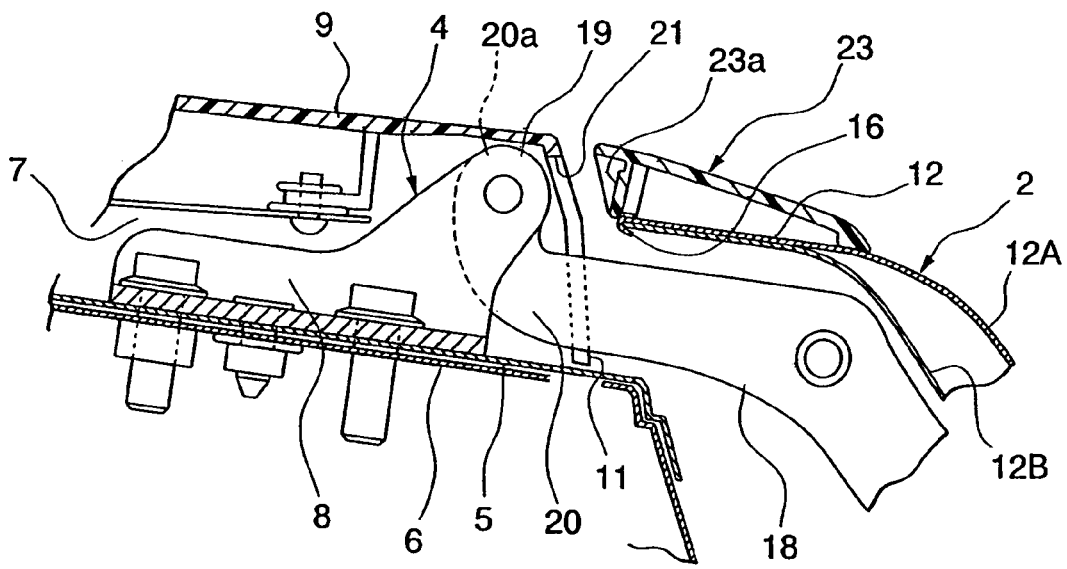
FIG. 4 is a cross-sectional view taken along the line B-B of FIG. 2 in a state where a tailgate is closed.
Figure 5:
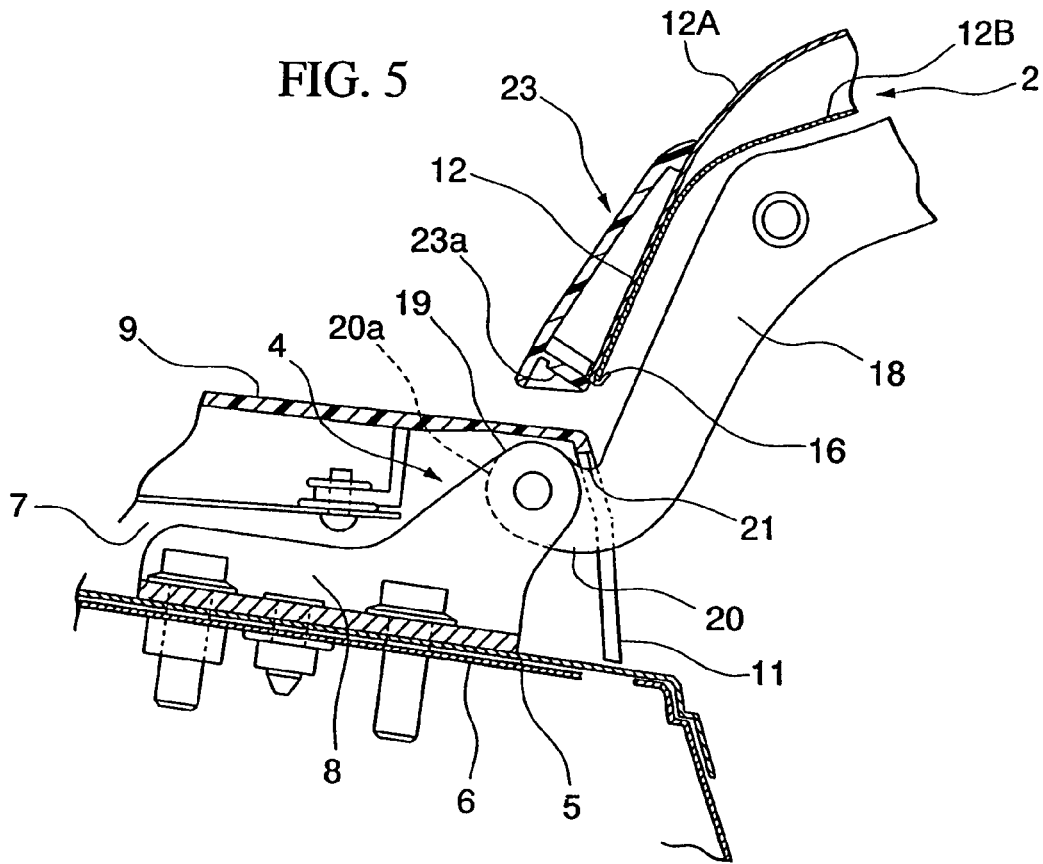
FIG. 5 is a cross-sectional view taken along the line B-B of FIG. 2 in a state where the tailgate is opened.

FIG. 4 is a cross-sectional view taken along the line B-B of FIG. 2 in a state where the tailgate 2 is closed. FIG. 5 is a cross-sectional view taken along the line B-B of FIG. 2 in a state where the tailgate 2 is opened. As shown in FIGS. 4 and 5, a hinge base 8 of the hinge 4 mounting the tailgate is fixed to and a resin hinge cover 9 covering an upper portion of the hinge base 8 is mounted on an end of the junction groove 7 at the rear part of the vehicle body. A front end of the hinge cover 9 is formed to be continuously flush with a roof molding 10 adhered to the junction groove 7. A rear wall 11 closing the end of the junction groove 7 in the rear part of the vehicle body is formed at a rear end of the hinge cover 9.

The tailgate 2 includes a frame panel 12 composed of a steel plate, a door glass 13 mounted on the frame panel 12, a garnish 14, and an inner panel (not shown). An upper edge of the frame panel 12 is curved to the front of the vehicle body along a rear corner profile.

In the frame panel 12, an outer panel 12A and an inner panel 12B are overlapped with each other as shown in FIGS. 4 and 5. Outer peripheries of the outer panel 12A and the inner panel 12B are connected to each other by a hem processing operation. Reference numeral 16 in the figure represents a hem flange (hem processing portion) bent at the time of the hem processing operation. A gate hinge 18 of the hinge 4 of which a front end is connected to the hinge base 8 is fixed onto both rear surfaces at the upper edge of the frame panel 12 in the vehicle width direction.

A support piece 19 protruding upward from the rear end of the vehicle body is integrally formed in the hinge base 8 at the roof. An extension piece 20 of the gate hinge 18 is rotatably connected to the upper end of the support piece 19. The extension piece 20 of the gate hinge 18 protrudes forward from the rear surfaces at the upper end of the frame panel 12 of the tailgate 2. A front end of the extension piece 20 is curved substantially in an L-shape and protrudes upward, thereby forming a curve end 20a. The curve end 20a is rotatably supported in the support piece 19 of the hinge base 8. As shown in FIGS. 4 and 5, the extension piece 20 of the gate hinge 18 pivots in a vertical direction centering around a connection portion of the extension piece 20 connected with the hinge base 8 in accordance with the opening and closing operations of the tailgate 2. A slit-shaped notch 21 allowing the extension piece 20 to vertically pivot is formed in the rear wall 11 of the hinge cover 9 covering the hinge base 8.

Figure 6:
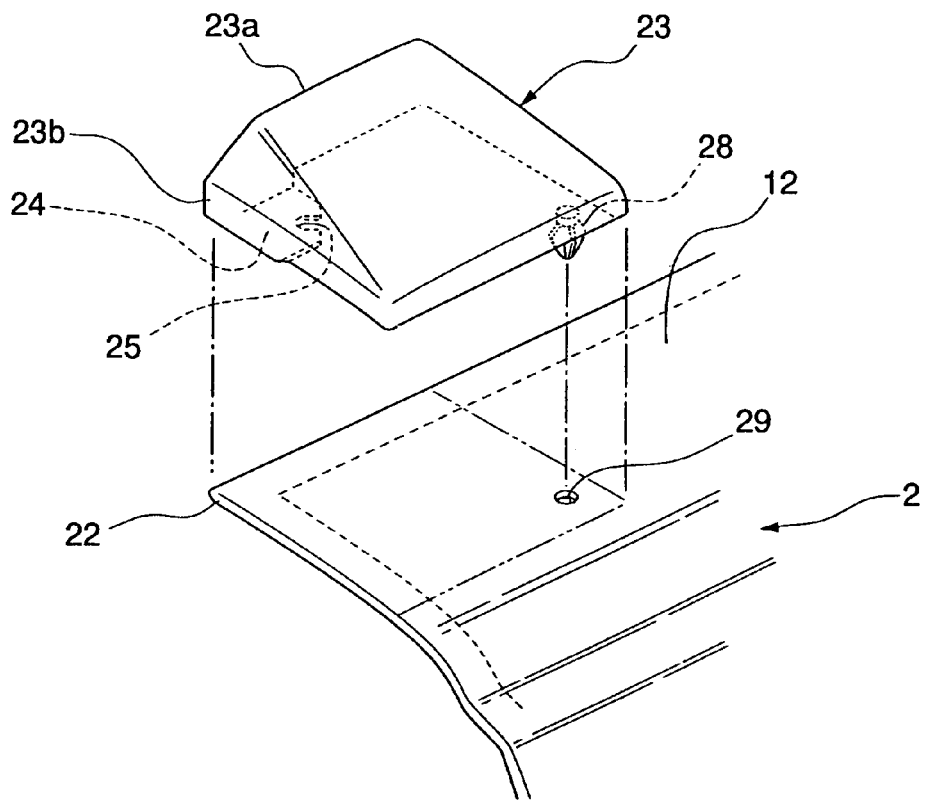
FIG. 6 is an exploded perspective view showing a mounting portion of a rear shielding member according to the embodiment.

FIG. 6 is an exploded perspective view of an upper portion of the tailgate 2. As shown in FIG. 6, substantially perpendicular corners 22 are disposed at both sides of the upper edge of the frame panel 12 of the tailgate 2 in the vehicle width direction. A rear shielding member 23 opposed to the rear wall 11 of the hinge cover 9 is mounted on an upper surface of each of the corners 22.

Figure 3:
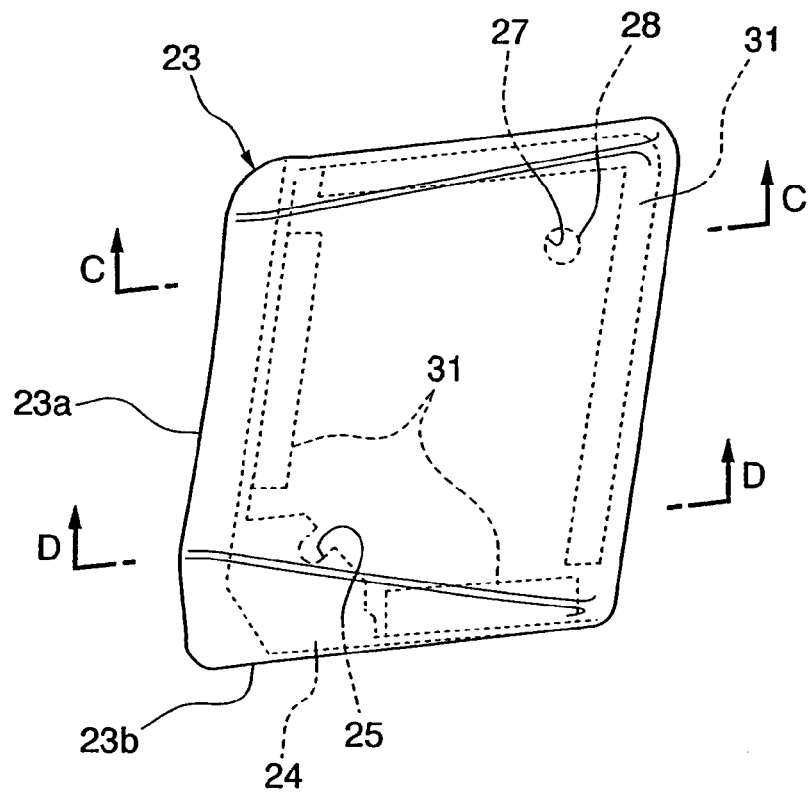
FIG. 3 is a plan view showing a rear shielding member according to the embodiment.
Figure 7A:
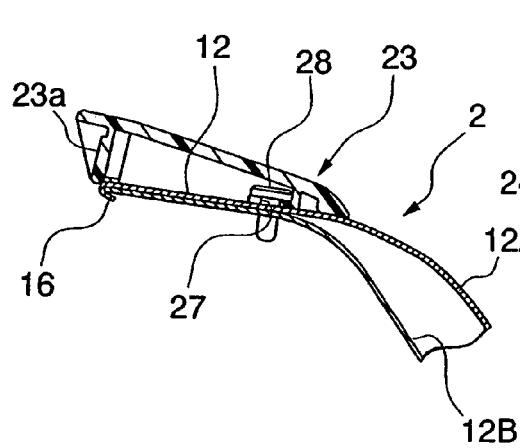
FIG. 7A is a cross-sectional view taken along the line C-C of FIG. 3.
Figure 7B:
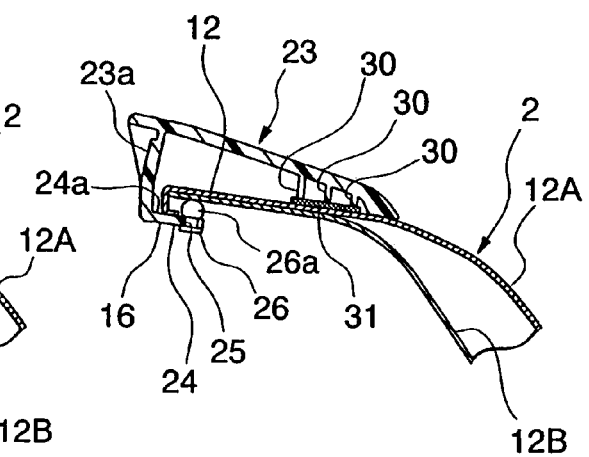
FIG. 7B is a cross-sectional view taken along the line D-D of FIG. 3.

FIG. 3 is a plan view of the rear shielding member 23. FIG. 7A is a cross-sectional view taken along the line C-C of FIG. 3. FIG. 7B is a cross-sectional view taken along the line D-D of FIG. 3.

The rear shielding member 23 is formed in a box-type section opened downward by a resin material which is the same as the material of the roof molding 10 or the hinge cover 9 The rear shielding member 23 is opposed to the rear wall 11 of the hinge cover 9, thereby concealing the notch 21 of the rear wall 11 from the outside. The rear shielding member 23 is formed to be substantially rectangular shaped in its plan view as shown in FIGS. 2 and 3. The width of the rear shielding member 23 in the vehicle width direction is the same as that of the hinge cover 9. A protrusion height of the front end of the rear shielding member 23 is the same as the height of the hinge cover 9 as shown in FIGS. 2 and 4 in a state where the tailgate 2 is closed. The rear shielding member 23 slants smoothly so that the height thereof decreases from the front end to the rear end, and the rear shielding member 23 is formed to be continuously flush with an outer surface of an outer exposed portion of the hinge cover 9, thereby being formed to be visually flush with a curved outer surface of the frame panel 12 of the tailgate 2.

A locking piece 24, which is curved in a substantially L-shape in the inward direction of the rear shielding member 23, is installed in the vicinity of a joint corner of a front wall 23a of the rear shielding member 23 of the vehicle body and an outer side wall 23b of the rear shielding member 23 in the vehicle width direction as shown in FIGS. 3 and 6. When the rear shielding member 23 is disposed on the upper surface of the frame panel 12, the locking piece 24 turns around the rear surface of the corner 22 of the frame panel 12, and thus the locking piece 24 is positioned in and locked to the corner 22. An inner surface of the locking piece 24 is a hem abutting portion 24a which abuts a strong hem flange 16 of the frame panel 12. A locking groove 25 is disposed at an extension end of the locking piece 24. A resin grommet 26 is mounted on the locking groove 25. A spheric head portion 26a disposed on a tip end of the resin grommet 26 abuts a back surface of the frame panel 12 in a state where a base of the resin grommet 26 is mounted on the locking groove 25.

A clip locking portion 27 is disposed in the vicinity of a corner diagonal to the corner of the locking piece 24 on the rear surface of the rear shielding member 23 as shown in FIGS. 3 and 7A. A resin clip 28 is mounted on the clip locking portion 27. When the rear shielding member 23 is overlapped with the upper surface of the corner 22 with the locking piece 24 locked to the corner 22 of the frame panel 12, the resin clip 28 is pushed into a mounting hole 29 (see FIG. 6) disposed on the frame panel 12 from the upside, and thus the resin clip 28 is fitted in the mounting hole 29.

A plurality of ribs (attitude holding members) 30 (see FIG. 7B) protrude from the inside of the rear shielding member 23 along a peripheral wall including the front wall 23a and the side wall 23b. An end face of each rib 30 abuts the upper surface of the frame panel 12 via a sheet-like resilient member (attitude holding member) 31 (see FIG. 3). The resilient member 31 may be formed of a solid rubber or a foaming rubber, for example. In the present embodiment, the solid rubber is used for the resilient member 31 corresponding to the rib 30 disposed along the front wall 23a and the side wall 23b and the foaming rubber is used for the resilient member 31 corresponding to the rib 30 disposed along a wall other than the front wall 23a and the side wall 23b. The ribs 30 and the resilient members 31 function to stabilize an attitude of the rear shielding member 23 mounted on the frame panel 12, and the ribs 30 and the resilient members 31 constitute an attitude holding member of the rear shielding member 23.

As described above, in the rear structure of the vehicle body 1, the rear shielding members 23 are disposed at positions of the upper end of the tailgate 2 opposed to the rear walls of the hinge covers 9 disposed at left and right sides of a roof. Accordingly, the notch 21 of each hinge cover 9 is covered up with the rear shielding member 23 in a state where the tailgate 2 is closed, and thus it is possible to prevent the notch 21 from deteriorating the outer appearance of the vehicle.

In particular, in the present embodiment, since the rear shielding member 23 is formed of the resin material which is the same as the material of the roof molding 10 or the hinge cover 9 and the rear shielding member 23 is formed to be continuously flush from the hinge cover 9 to the rear side of the vehicle body, no discomfort is caused as viewed from the outside of the vehicle, thereby improving the appearance of the vehicle body.

Since the notch 21 is covered with the rear shielding member 23 mounted on the frame panel 12, the frame panel 12 can be manufactured more easily in comparison with a case where a member covering the notch 21 is directly formed on the frame panel 12.

In the present embodiment, the locking piece 24 turning around the corner 22 of the frame panel 12 of the tailgate 2 is disposed at the lower end of the front wall 23a and the side wall 23b of the rear shielding member 23. Since the rear shielding member 23 is positioned and supported in the corner 22 by means of the locking piece 24, it is possible to mount the rear shielding member 23 on the frame panel 12 with ease and precision.

In particular, in the present embodiment, a rear surface of the locking piece 24 is the hem abutting portion 24a, which abuts the hem flange 16 of the frame panel 12. Accordingly, it is possible to tightly mount the rear shielding member 23 by means of the strong hem processing portion.

Since the spheric head portion 26a of the resin grommet 26 mounted on the locking piece 24 abuts the rear surface of the frame panel 12, it is possible to stably support the rear shielding member 23 on the frame panel 12 without rattling.

Moreover, in the rear shielding member 23 according to the present embodiment, since a portion of the rear shielding member 23 spaced from the locking piece 24 is engaged in the frame panel 12 by means of the resin clip 28 in a state where the locking piece 24 is locked to the corner 22 of the frame panel 12, it is possible to mount the rear shielding member 23 on the frame panel 12 easily and stably.

In the present embodiment, the plurality of ribs 30 protrude from the inside of the peripheral wall of the rear shielding member 23 and the resilient member 31 is interposed between each rib 30 and the frame panel 12, whereby the rear shielding member 23 is mounted on the frame panel 12. Accordingly, it is possible to stably hold the attitude of the rear shielding member 23 at all times even in a state where impact is frequently applied to the vehicle body by the opening and closing operations of the tailgate 2. Accordingly, it is possible to hold the rear shielding member 23 at a predetermined position without the rattling or displacement in a case where the rear structure of the vehicle body 1 is employed.

Moreover, the present invention is not limited to the above-mentioned embodiment, but various modifications in layout may be made without departing from the scope of the present invention. Additions, omissions, substitutions, and other modifications in configuration may be made without departing from the scope of the present invention. The present invention is not to be considered as limited by the foregoing description, and is only limited by the scope of the appended claims or the equivalents thereof.

What is claimed is:

1. A rear structure of a vehicle body in which a tailgate is mounted on a rear part of the vehicle body so as to be openable and closable, the rear structure comprising:
   a hinge member having a hinge base fixed into a groove extending in the length of the vehicle body, and a gate hinge rotatably connected to the hinge base and fixed to the tailgate;
   a hinge cover having a rear wall covering the rear portion of the hinge base and having a notch allowing the gate hinge to pass therethrough, the hinge cover closing a rear end of the groove and covering an upper portion and a rear portion of the hinge base; and
   a rear shielding member fixed to the tailgate,
   wherein:
   the rear shielding member is configured to cover the notch as viewed from the exterior of the vehicle body when the tailgate is closed,
   a locking piece, locked to an upper front corner of a frame panel of the tailgate, is disposed in the rear shielding member, and
   a portion of the rear shielding member, which is spaced from the locking piece, is fixed to the frame panel by a clip.

2. The rear structure of a vehicle body according to claim 1, wherein a plurality of ribs protrude from the inside of the peripheral wall of the rear shielding member and a resilient member is interposed between each rib.

3. The rear structure of a vehicle body according to claim 2, wherein an end of each rib abuts the upper surface of the resilient member.

4. The rear structure of a vehicle body according to claim 3, wherein the ribs and the resilient member stabilize the rear shielding member on the tailgate.

* * * * *